Oct. 12, 1971  R. L. WILBUR  3,611,791
REMOTE AIR TEMPERATURE INDICATOR
Filed Dec. 22, 1969
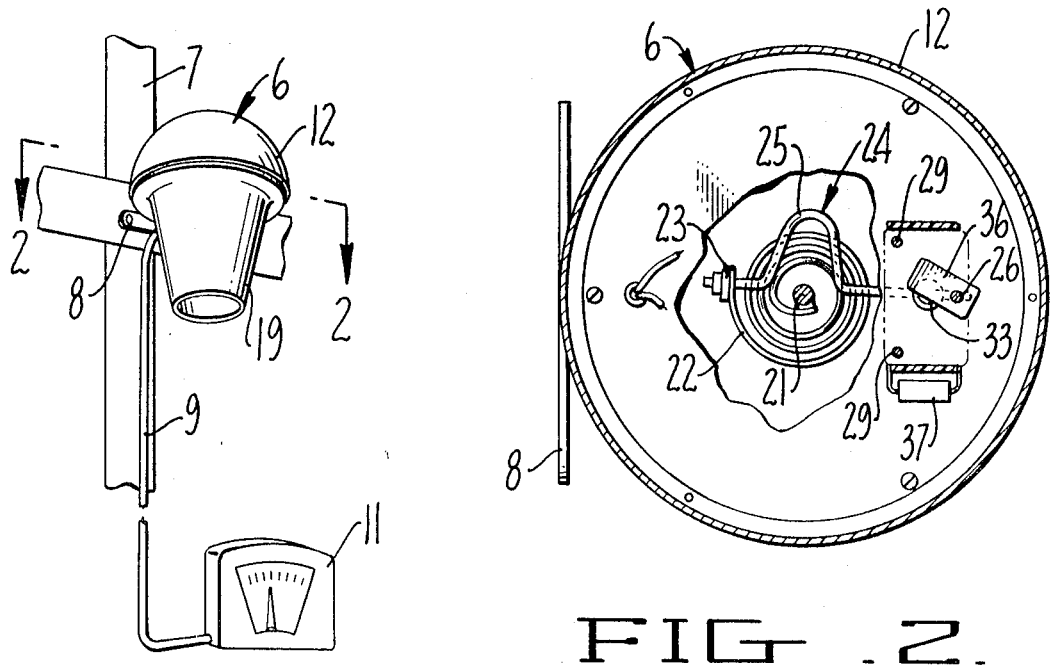
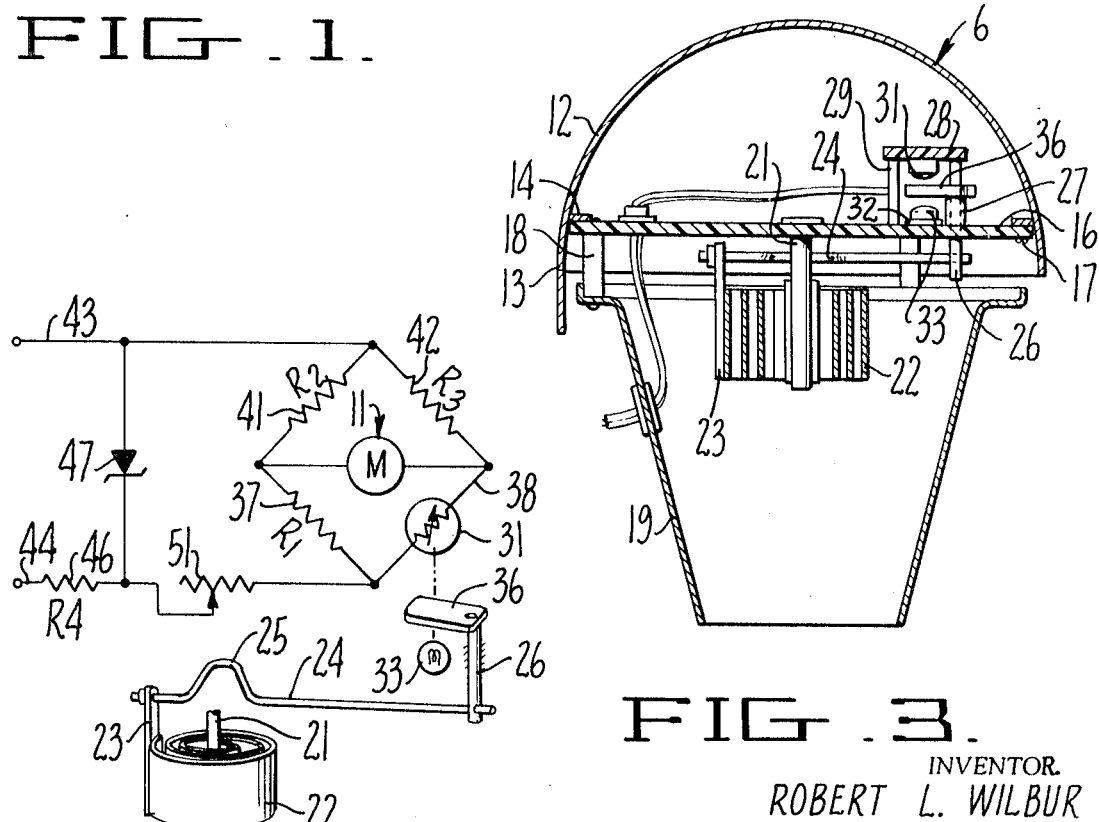
INVENTOR.
ROBERT L. WILBUR
BY
ATTORNEYS

3,611,791
REMOTE AIR TEMPERATURE INDICATOR
Robert L. Wilbur, North Windham, Maine, assignor to
The Eastern Company, Portland, Maine
Filed Dec. 22, 1969, Ser. No. 887,105
Int. Cl. G01k 5/72
U.S. Cl. 73—363.7      4 Claims

ABSTRACT OF THE DISCLOSURE

A linear output meter with a range reading from −40° F. to +120° F. is provided across the arms of a Wheatstone bridge. One branch of an arm of the Wheatstone bridge includes a photoelectric cell, the resistance of which is dependent on how much light falls on the cell. The cell is provided at a location remote from the meter. A constantly burning electric light is provided in association with the photoelectric cell and the amount of light passing to the cell is controlled by a shutter moved by a bimetallic coil strip which is located in the region where it is desired to ascertain the temperature. The movement of the coil strip in turn moves the shutter which varies the amount of light falling on the photoelectric cell from the light and so varies the resistance of the cell, upsetting the bridge circuit.

SUMMARY OF THE INVENTION

A coiled bimetallic strip is utilized to move a shutter which controls the amount of light falling on a photoelectric cell and so varies its resistance. The cell is included in one branch of an arm of a Wheatstone bridge circuit. The variation of the resistance of the cell upsets the bridge circuit and so affects the calibrated bridge meter which reads in degrees F. from −40° to +120°.

An object of the invention is to provide a temperature indicating device including a Wheatstone bridge wherein the temperature responsive element is provided at a substantial distance from the potential measuring instrument.

A further object of the present invention is to provide a measuring circuit, including a Wheatstone bridge, in which suitable voltage regulation may be maintained and applied so that even though the resistance of one arm of the bridge may vary from installation to installation, the reading of the measuring instrument in the bridge is the same when the temperature affecting a temperature responsive element is identical as between the two different installations.

Other objects and features of the invention will appear in the following when the present preferred embodiment of the invention is disclosed.

A BRIEF DESCRIPTION OF THE DRAWINGS

FIG. 1 is a perspective view illustrating an installation of the embodiment of the present invention.

FIG. 2 is a section taken along the line 2—2 in FIG. 1, a portion of the device shown being broken away to illustrate the relationship between the coiled bimetallic element and the shutter which it moves to vary the amount of light transmitted to the photoelectric cell.

FIG. 3 is a side elevation partly in section through the device.

FIG. 4 is a schematic view of the device showing the circuitry involved and the relation of the coiled metallic spring shutter, the light and the photoelectric cell.

DESCRIPTION OF THE PREFERRED EMBODIMENT

It is generally desired to ascertain the atmospheric temperature at some point which is out-of-doors and to be able to read the temperature on a meter which is provided indoors. Thus, as is shown particularly in FIG. 1, a housing 6 for a presently described temperature responsive element is mounted upon a suitable support 7 at a desired outdoor location, the housing being secured to the support by a bracket 8. A cable 9 leads from the temperature responsive device to a meter 11 which is provided indoors and which is calibrated to provide a temperature reading of from −40° F. to +120° F.

The housing 6 includes a semi-spherical dome portion 12 having a depending rim 13 so that snow, sleet or rain does not enter the housing. The housing includes an inner circular rim 14 which extends about the equator thereof and provides a support for a circular plate 16 which is secured to the rim by screws 17. Three spacers 18 are provided at 120° intervals about the plate 16, the spacers providing support for a frusto-conical skirt 19 which permits air circulation but prevents the entrance of any snow, sleet or rain.

A fixed support 21 depends from the plate 16 and the inner end of a spirally coiled bimetallic strip 22 is secured to the support 21. A bar 23 is secured to the outer end of the spiral strip 22. The bar carries an arm 24 which extends transversely and parallel to the plate 16. Intermediate its ends the arm 24 is provided with a U-bend 25 so that the arm can move toward and away from the fixed support 21. The outer end of the arm 24 is engaged with a shaft 26 which extends through the plate and is supported for rotation on the plate by a collar 27. The upper end of the shaft 26 is supoprted in transverse support 28 secured on the plate by vertical supports 29. Provided on the underside of the support 28 is a photoelectric cell, generally indicated as 31, mounted on a transverse support 32 provided on plate 16. An electric light 33 is provided cooperatively below the photoelectric cell to supply light to the cell. Intermediate the ends of that portion of the shaft 26 which is above the plate 16 is a blade or shutter 36 which serves to control the amount of light transmitted from the light 33 to the photoelectric cell 31. The photoelectric cell 31 and a resistance 37 (designated $R_1$ in FIG. 4) are provided respectively in two branches of one arm 38 in a Wheatstone bridge circuit; the resistance 37 being mounted on a side of the support 28. The other arm of the Wheatstone bridge includes resistances $R_2$ and $R_3$, designated at 41 and 42 in FIG. 4.

The Wheatstone bridge is supplied with a suitable potential from lines 43 and 44, the latter including resistance $R_4$ designated as 46. Application of a constant voltage across the Wheatstone bridge is assured by the inclusion of a constant voltage regulation device, such as a Zener diode 47 or a gas discharge tube, as is well-known.

Since the meter 11 is placed wherever desired, it will be obvious that the length of cable 9 will vary from installation to installation. To permit this, I preferably include a variable potentiometer 51 on one side or the other of the constant voltage regulator and connected to one of the arms of the bridge. Thus, with the meter 11 suitably calibrated for one installation and for one length of cable 9, when a different length of cable 9 is utilized, it is only necessary to adjust the potentiometer 51 so that the reading of the meter corresponds to the ambient temperature then affecting the coiled bimetallic strip 22.

In one embodiment of the invention, the various resistances and the potentiometer had the following values:

| Element: | Fig. No. in dwg. | Value |
|---|---|---|
| $R_1$ | 37 | 33,000 ohms, ½ watt. |
| $R_2$ | 41 | Do. |
| $R_3$ | 42 | Do. |
| $R_4$ | 46 | Do. |
| Ammeter | 11 | 0-200 microamperes. |
| Zener diode | 47 | 11 volts. |
| Potentiometer | 51 | 0-20,000 ohms. |

From the foregoing, I believe it is apparent that this invention provides a linear output meter reading within a broad temperature range as from −40° F. to +120° F. and utilizing a remote sensor. Thermistor and glass bulb type remote devices are inherently non-linear, particularly in the −0 to −40° F. range. By using a linear bimetallic strip with a varied electronic signal output, the shortcomings of thermistors and glass bulb type remote control devices are successfully, simply and inexpensively overcome.

I claim:

1. A temperature measuring device comprising a plate, a support mounted on one side of the plate, a coiled bimetallic strip having its inner end fixed on the support, an arm engaged with the outer end of the coiled strip, a shaft mounted in the plate and extending therethrough and supporting the arm, a vane secured to the shaft and extending normal to the shaft and parallel to the plate on the other side of the plate, a constantly burning light mounted on the plate on one side of the vane, and a photoelectric cell supported on the plate on the other side of the vane, the vane being moved by the coiled strip to alter the amount of light permitted to pass to the cell.

2. A temperature measuring device comprising a plate, a support mounted on one side of the plate, a coiled bimetallic strip having its inner end fixed on the support, an arm engaged with the outer end of the coiled strip, a shaft mounted in the plate and extending therethrough and supporting the arm, a vane extending normal to the shaft and parallel to the plate on the other side of the plate, a constantly burning light mounted on the plate on one side of the vane, the vane being moved by the coiled strip to alter the amount of light permitted to pass to the cell, a photoelectric cell supported on the plate on the other side of the vane, a Wheatstone bridge circuit including said photoelectric cell in one branch of a first arm of the bridge and a resistance in the other branch and in a second arm a resistance in each branch of such second arm, the two arms being in parallel, a meter connected between the midpoint of the arms, means for applying a voltage to the two arms, a constant potential electronic valve means connected across the voltage applying means, and a variable potentiometer connected between one side of the electronic valve means and one end of both arms for varying the potential applied to the bridge for adjusting the voltage applied to the bridge circuit.

3. A device as in claim 1 wherein the plate extends horizontally, a dome closure is provided over the other side of the plate, and a frustoconical member depends from the plate to provide access of the atmosphere to the coiled bimetallic strip.

4. A device as in claim 2 wherein the plate extends horizontally, a dome closure is provided over the other side of the plate, and a frustoconical member depends from the plate to provide access of the atmosphere to the coiled bimetallic strip.

References Cited

UNITED STATES PATENTS

| 416,006 | 11/1889 | Moennich | 73—363.7 X |
| 1,325,547 | 12/1919 | Wheeler | 73—363.7 |
| 3,002,099 | 9/1961 | Gregory et al. | 250—210 X |
| 3,036,464 | 5/1962 | Beeston | 73—362 AR |
| 3,337,739 | 8/1967 | Sendro | 250—231 |

FOREIGN PATENTS

| 1,187,827 | 2/1965 | Germany | 73—363.7 |

LOUIS R. PRINCE, Primary Examiner

F. SHOON, Assistant Examiner

U.S. Cl. X.R.

73—339 R; 250—231 R; 350—269; 356—225